US009219910B2

(12) United States Patent
Reichow et al.

(10) Patent No.: US 9,219,910 B2
(45) Date of Patent: Dec. 22, 2015

(54) VOLUMETRIC DISPLAY SYSTEM BLENDING TWO LIGHT TYPES TO PROVIDE A NEW DISPLAY MEDIUM

(71) Applicant: DISNEY ENTERPRISES, INC., Burbank, CA (US)

(72) Inventors: Mark A. Reichow, Valencia, CA (US); Daniel M. Joseph, Los Angeles, CA (US); Scott J. Sohan, Newbury Park, CA (US)

(73) Assignee: Disney Enterprises, Inc., Burbank, CA (US)

(*) Notice: Subject to any disclaimer, the term of this patent is extended or adjusted under 35 U.S.C. 154(b) by 308 days.

(21) Appl. No.: 13/951,048

(22) Filed: Jul. 25, 2013

(65) Prior Publication Data
US 2015/0029314 A1 Jan. 29, 2015

(51) Int. Cl.
- H04N 9/31 (2006.01)
- H04N 13/04 (2006.01)
- G02B 27/20 (2006.01)

(52) U.S. Cl.
CPC ......... H04N 13/0459 (2013.01); H04N 9/3147 (2013.01); H04N 13/0488 (2013.01); *G02B 27/20* (2013.01); *H04N 9/3129* (2013.01); *H04N 9/3132* (2013.01); *H04N 9/3185* (2013.01); *H04N 2013/0461* (2013.01)

(58) Field of Classification Search
CPC ............ H04N 9/3147; H04N 13/0488; H04N 2013/0461; H04N 9/3185; H04N 9/3129; H04N 9/3132; G02B 27/20
See application file for complete search history.

(56) References Cited

U.S. PATENT DOCUMENTS

| | | | |
|---|---|---|---|
| 6,431,711 B1* | 8/2002 | Pinhanez | G03B 21/28 348/E5.137 |
| 6,910,778 B2* | 6/2005 | Hamana | G02B 27/20 345/158 |
| 7,090,358 B2* | 8/2006 | Feigel | G06F 3/011 348/77 |
| 8,066,384 B2* | 11/2011 | Rivera | G03B 21/00 345/419 |
| 8,155,872 B2* | 4/2012 | Kjeldsen | G01C 21/206 340/8.1 |
| 8,194,193 B2* | 6/2012 | Streid et al. | 348/744 |
| 8,454,173 B2* | 6/2013 | Nakamura | G03B 21/14 345/1.3 |
| 8,587,497 B2* | 11/2013 | Streid et al. | 345/1.3 |
| 2002/0105623 A1* | 8/2002 | Pinhanez | G03B 21/28 353/69 |
| 2003/0132912 A1* | 7/2003 | Hamana | G02B 27/20 345/156 |
| 2005/0195373 A1* | 9/2005 | Feigel | G06F 3/011 353/94 |
| 2008/0079908 A1* | 4/2008 | Choi | G03B 21/56 353/79 |
| 2008/0180637 A1* | 7/2008 | Kjeldsen | G03B 21/00 353/11 |
| 2009/0066858 A1* | 3/2009 | Turner | G03B 21/56 348/744 |
| 2009/0091711 A1* | 4/2009 | Rivera | G03B 21/00 353/28 |

(Continued)

*Primary Examiner* — Bao-Luan Le
(74) *Attorney, Agent, or Firm* — Marsh Fischmann & Breyfogle LLP; Kent A. Lembke

(57) ABSTRACT

A method for creating a volumetric display. The method includes projecting a first light type onto a planar projection surface to display first content and, concurrently with projection of the first light type, first projecting a second light type onto the planar projection surface to display second content that at least partially overlays the displayed first content. The method includes second projecting the second light type onto a three dimensional (3D) set of reflective elements, whereby the second content moves between the planar projection surface and the 3D set. The first light type may be non-coherent light and the second light type may be laser light (or coherent light). While projected on the planar projection surface, the coherent light is at a first illumination level that matches or is somewhat greater than the non-coherent light, and a second much higher illumination level is used when projecting onto the 3D set.

19 Claims, 6 Drawing Sheets

(56) References Cited

U.S. PATENT DOCUMENTS

| | | | | |
|---|---|---|---|---|
| 2009/0201430 A1* | 8/2009 | Streid | G03B 21/00 | 348/744 |
| 2010/0220293 A1* | 9/2010 | Mizushima | G02B 6/06 | 353/20 |
| 2010/0309293 A1* | 12/2010 | Plut | H04N 9/3147 | 348/51 |
| 2010/0309390 A1* | 12/2010 | Plut | H04N 9/3147 | 348/744 |
| 2011/0157486 A1* | 6/2011 | Murata | G08B 7/062 | 348/744 |
| 2011/0205497 A1* | 8/2011 | Wakabayashi | G02B 26/101 | 353/28 |
| 2012/0212627 A1* | 8/2012 | Klose | H04N 9/3182 | 348/189 |
| 2012/0218170 A1* | 8/2012 | Streid et al. | | 345/1.3 |
| 2013/0181901 A1* | 7/2013 | West | G09G 5/14 | 345/161 |

\* cited by examiner

VOLUMETRIC DISPLAY SYSTEM BLENDING TWO LIGHT TYPES TO PROVIDE A NEW DISPLAY MEDIUM

BACKGROUND

1. Field of the Description

The present description relates, in general, to the illusion of stereoscopic or three dimensional (3D) image generation and projection, and, more particularly, to systems and methods for producing 3D images or depth and space media illusions without requiring viewers to wear 3D glasses or the like (e.g., multi-canvas display systems providing a 3D display to viewers rather than using projected images requiring a viewing technology such as 3D glasses to be properly viewed). Such a display system may involve blending of two light types to provide a new display medium.

2. Relevant Background

There is a growing trend toward using 3D projection techniques in theatres and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and other appear farther away than the screen. Stereoscopy, stereoscopic imaging, and 3D imaging are labels for any technique capable of creating the illusion of depth in an image.

Many techniques have been devised and developed for projecting stereoscopic images to achieve a 3D effect. One technique is to provide left and right eye images for a single, offset two-dimensional image and displaying them alternately, e.g., using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic viewing is the use of anaglyphs. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles. While these display or projection systems may differ, each typically requires a stereographic image as input in which a left eye image and a slightly offset right eye image of a single scene from offset cameras or differing perspectives are provided to create a presentation with the appearance of depth.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas. As discussed above, 3D imagery is one exciting way to appeal to viewers and hold their attention.

However, the use of 3D imagery has, in the past, been limited by a number of issues. Typically, 3D projection is used only in low light environments and is not particularly effective in applications where there is a significant amount of ambient light such as an outdoor venue during the daytime (e.g., an amusement park or athletic stadium in the morning or afternoon where conventional 3D video image projection cannot compete with sunlight). Further, 3D projection technologies generally require the viewer to wear special viewing glasses, which is often inconvenient for many applications and can significantly add to costs. Further, 3D projection techniques typically have not allowed viewers to interact or walk onto the "set" or display area. Hence, there remains a need for systems and methods for providing autostereoscopic or 3D displays in a cost effective manner, in the presence of higher ambient light levels, and without the need for special eye or head wear.

SUMMARY

The present description presents a display system (and corresponding methods) for providing a visual display by marrying or blending two or more types of light. During operation of the display system, a first light type (e.g., light from a video projector) may be projected onto a first canvas (e.g., a front or rear projection screen), and, then, a second light type (e.g., coherent light from a laser projector) may be projected onto the first canvas so as to be blended with the projected first light type. Next, the stream of the second type of light may be moved along a path or trajectory that causes it to leave or jump from the first canvas onto a second canvas, which may be spaced apart from the first canvas or abut the first canvas at an angle to create a volumetric display environment with the two (or more) canvases.

The second "canvas" may be configured as a 3D set (or display scene) with a number of elements with surfaces that reflect the second type of light to an audience. These reflective elements may include a backdrop (or projection screen), one-to-many reflective members spaced apart and in front of the backdrop, and 3D props (e.g., electric lights that can be "lit" or activated when the trajectory of the stream of the second type of light passes over or near the props). The reflective elements may have low reflectivity such that they are nearly invisible to the audience until struck by the stream of the second type of light, and, to this end, the reflective elements may be formed of scrim, tulle (a netting-type fabric with many gaps or openings), or other woven/mesh and/or lower reflectivity materials (e.g., less than about 6 to 10 percent reflectivity).

It was recognized that the two types of light that could be blended in a display system to create desirable visual effects could be coherent light (use a laser projector for one light source to provide light with spatial coherence that creates focus of light at any point) and light from a projector (e.g., a conventional video projector or projectors). In some cases, all waves within the laser light are in phase and in step with each other and do not interfere with one another over a spatial distance. Laser projection may be used to produce volumetric visual effects that appear to occur in space and not specifically on a screen or object at which the light is aimed. Examples include star fields, pixie dust, and fireworks. Hence, laser-produced light or media may be thought of as "point-based" or "particle-based" media (note, this includes particles of a vector as it can be lines, too) to differentiate it from "pixel-based" media or light emitted from common film and digital projectors. Pixel-based projections are optically focused on a projection surface and are characteristically low contrast and low brightness compared to particle-based projections from lasers or laser projectors. Contrast and brightness in a display are the results of the two types of light (pixels and points do not influence these aspects of the produced display).

Further, it was recognized that the projected, particle-based images (from the laser projectors) are created or generated by drawing or rastering the laser to form "shapes" where the laser scans over a predetermined area and shape for a time sufficient to register an image in the viewer's eye and then the laser moves on to paint another rastered image at another location. The laser can be aimed at nearly any surface in a display space or environment (a display volume) such as a projection screen, props and set pieces, walls, the ceiling, and/or scrim or similar materials placed in the display space or volume. Unlike pixel-based media, the particle-based media forms an image anywhere in the volume without needing to be refocused. Because the laser presents an effect of a nearly infinite focal length, the spot of light and images drawn with the spot of light appear in focus throughout the volume of the display space. Current laser projection equipment moves the laser light by physically moving the direction of the emitter, using mirrors and the like, which produces discrete visible light effects by blanking the beam or masking the beam while it transits over a trajectory or path from one target to the next (from a first canvas to a second canvas of a 3D display). Although a laser is only projecting a single beam of light, current laser projectors can move the beam fast enough to produce many discreet images that appear to a human observer or viewer to be presented or projected at the same time.

The volumetric or 3D display systems discussed provide integrated overlays of two types of light from two different media or light sources. In one display system, a laser projector projects a layer of coherent light upon a layer of light (non-coherent light) projected from a video projector. The two light sources are controlled to interact with each other to blend the two layers of light and then to separate the two layers and provide the coherent light on a second canvas that may include volume with two or more layers of scrim, tulle, or other elements that reflect portions of the coherent light to a viewer.

The present description relates to a method of creating shows that have conventional pixel-based projected media presented in a coordinated, coherent manner with a particle-based (e.g., laser) projection. The particle effects are "coordinated" with the pixel-based projected media in the sense that timing, position, and/or color characteristics allow the viewer of the two blended media (or two blended light-type layers) to perceive the particle effects as part of the pixel-based presentation during at least a subset of the timeline of the overall presentation or display and then to jump off (or jump onto) the screen where the pixel-based media is displayed into a nearby space or volume during other portions of the timeline. Pixel-based projection alone cannot achieve this selective blending and separation of two layers of projected light onto two or more canvases/projection surfaces, and the effect has proven to be quite effective in pleasing and surprising viewers of the 3D display or integrated volumetric light display.

Further, the description teaches a method and/or protocol (and corresponding system) for authoring or creating media that has volumetric components (e.g., the laser light that can jump to a 3D set or second canvas) and non-volumetric components (e.g., video projected onto a 2D projection screen or first canvas) that can later be displayed in a coordinated and blended fashion. At a device level, this may mean using a projection system that has multiple modes of concurrently operating projectors, such as a laser projector and an LCD (liquid crystal display) or DLP (digital light processing) projector, with a control device that takes input media and controls what is projected by each of the two projectors (or two light-type sources).

More particularly, a method is provided for creating a volumetric display. The method includes projecting a first light type onto a planar projection surface to display first content. The method also includes, concurrently with the projection of the first light type, first projecting a second light type that differs from the first light type onto the planar projection surface to display second content that at least partially overlays the displayed first content. Further, the method includes second projecting the second light type onto a three dimensional (3D) set of reflective elements, whereby the second content moves between the planar projection surface and the 3D set.

To practice the method, the first light type may be non-coherent light and the second light type may be coherent light. The projecting of the first light type may include operating a video projector while the first and second projecting of the second light type may include operating a laser projector. Then, the operating of the video projector and the operating of the laser projector are time synchronized to cause corresponding frames of the first and second content to be concurrently displayed. Further, the first projecting of the second type of light provides laser light at a first illumination level and the second projecting of the second type of light provides laser light at a second illumination level that is at least two times the first illumination level (e.g., 2 to 4 times or more illumination provided by the laser projector when projecting on the 3D set). In contrast, the first illumination level of the laser light is within a range of plus or minus 25 percent of an illumination level of the first light type provided by the video projector on the planar projection surface (e.g., the laser light may match or be a small amount brighter than the video projector-provided light on the 2D projection surface).

In the method, the second content may be generated or provided for the laser projector by: (a) defining physical characteristics for a set of particles; (b) creating a 3D model of the planar projection surface and the 3D set; and (c) defining trajectories of the set of particles over a timeline, wherein the projection of the set of particles is mapped to physical locations of the planar projection surfaces and the reflective elements of the 3D set and wherein the timeline is used to synchronize projection of frames of the first content and the second content.

Also, in the method, the reflective elements of the 3D set may include two or more layers of material with reflectivity of less than about 20 percent. For example, the material may include scrim, toule, and/sheets of mesh material or perforated material. The low reflectivity material (or nearly invisible in lower light material) can be arranged in a variety of ways such as with multiple spaced apart layers with increasing density or reflectivity levels (e.g., the looser weave material is struck first by the laser light) to achieve a volumetric look. The volumetric display provided by the 3D set can be enhanced with physical props (e.g., an electronic light or candle that is activated when the laser light passes over or onto it) and by the arrangement of the scrim, toule, or other layers of material (e.g., placing some on the floor and hanging several spaced apart sheets, by placing some at an angle and some parallel to each other, by moving some of the reflective elements during projection such as with rotation, with back-and-forth movement, and/or with air movement, and the like).

In regard to the volumetric aspect of the present description, the resulting effect can be enhanced or changed by adjusting the reflective materials (like tulle and scrim) at angles and distances to break up the symmetrical patterns of the particles that result when scrims or other reflective material are layered too well or "perfectly." The laser projection of a particle pattern on a tulle will duplicate on parallel tulles behind it and can look like a repeated pattern. One goal of the present methods and systems is to create the illusion of a larger volume of particles by using multiple layers of tulle. Hence, it may be desirable to design the layers in a way that camouflages the pattern used to achieve a volumetric display. This may involve placing the reflective layers/materials at angles chosen or adjusted to help achieve this non-repeating arrangement. The set arrangement typically is also configured particularly to address the blow by. Sometimes the space is great or large enough to extinguish blow by, and it may be useful to add an opaque layer of a material like a silky fabric or the like (e.g., Duvetyne™ or other material) to terminate it. The multiplexing or layering provided in this manner is desirable to enhance the volumetric look achieved by a display system described herein.

DETAILED DESCRIPTION

Figure 1:
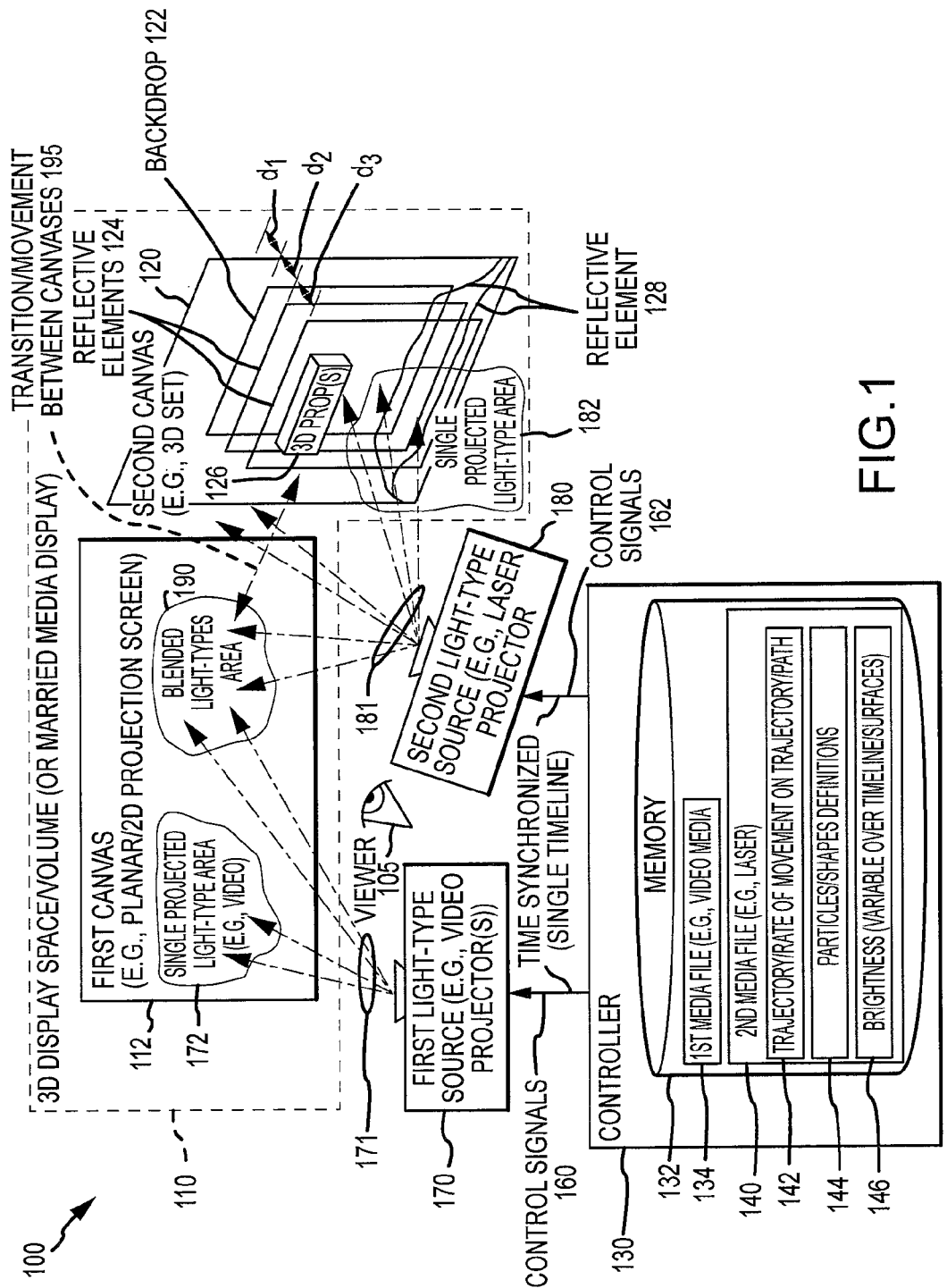
FIG. 1 illustrates a functional block diagram of a display system operating to provide two layers of light with different qualities and the layers can be selectively blended and separated to be provided on one canvas or on multiple canvases (e.g., jump off a 2D projection screen onto a second projection screen and/or 3D set)

Briefly, embodiments described herein are directed to a display system operable to provide two layers of light with different qualities. The layers can be selectively blended and separated to be provided on one canvas or on multiple canvases (e.g., jump off a 2D projection screen onto a second projection screen and/or 3D set). Prior to turning to FIG. 1 and an example of such a display system 100, it may be useful to explain the working environment or problem context in which the display system was generated and why the display system provides a very desirable visual effect for use in amusement parks and other settings.

Creating visually compelling special effects (or "FX") scenes for use in theme park attractions and other environments is desirable for providing an immersive experience. Designers of FX scenes often push the boundaries of what visually can be done and work to differentiate one display and experience from looks that have been seen so often that they have become common and flat to an audience. The development of new tools along with techniques and methods to use these new tools is useful in creating exciting displays that continue to interest visitors of theme parks and in many other settings such as shopping malls, musical venues, and entertainment complexes.

Video projection has been a solid tool used to create illusions and immersive environments. Video projection-based systems provide a display designer with the ability to produce designed imagery on designed surfaces. This tool has great attributes and capabilities but as with every tool there are limitations. Lamp-based projectors have a limit of brightness, contrast, color gamut, and saturation due to variables within the projection system (including the properties of the materials and surfaces imagery is projected on).

One significant goal for many FX designers is the ability to produce volumetric imagery. It can be a game changer to be able to convincingly create things that exist in what appears to be free air in the building of an immersive world or display experience. Typical tools for providing volumetric displays have included the artistic use of scrims and various transparent projection materials with video projectors, but the issue of image quality quickly comes into play. Good video projection (in front reflected applications) relies on the light reflecting back to the viewer's eyes. Projection materials like scrim rely on their surface openness to become invisible in a space, and they appear transparent because of this characteristic. The more open the scrim the more transparent the scrim is on a set or display space. This openness, though, is in direct contrast to what a video projector needs to produce a quality image for a viewer. Even the best scrim that is made from chiffon may only be 10 percent reflective. Although there are several types of video projector technologies, all of them fail to produce enough concentrated energy or light at the surface of the projected pixel to reflect above a certain limit, and the more open the material the less light is reflected. As a result, the use of video projectors with scrims and similar materials has not been wholly useful or satisfactory in creating volumetric or 3D displays.

In an attempt to address these complex challenges and achieve other display goals, the inventors designed a new set of tools that makes allowances for these issues and adds additional attributes to image quality that create a new medium of projection. The display system taught by this description provides artistic and designed blending of both video projection and laser projection (e.g., sources of first and second types of light that have different qualities such coherency, brightness, focal length, single versus multi-color, and so on).

Laser projectors have been around for a long time, and a large percentage of targeted use has been vector-type animation and psychedelic ethereal imagery at rock concerts. A galvanometer-scanning RGB (red-green-blue) laser projector produces its imagery quite differently than a video projector. The light that comes out of the projector is pure coherent light and has great color saturation and power and appears to always be in focus. It was recognized that, because the beam or stream of light from the laser projector is concentrated and focused, a large amount of energy is able to be targeted on a very small space, which equates to very good reflectivity regardless of the projection material. This means that very open scrims and tulle effectively work as projection surfaces. Hence, a volumetric imagery can be created in an open area of a space (or 3D set) by hanging reflective elements such as scrims, elements formed of tulle, and other props at different levels or distances from a reference plane or at depths/planes in the volumetric space corresponding to desired locations of projected objects (made of particles of light from the laser projector).

The limitation of this tool (i.e., a laser projector) is that it comes with a particle or points of light budget. The physical limitations of the scanning mirrors are one thing that drives this limitation of laser projectors, and the speed at which the lasers can be turned on and off is another factor driving this limitation. Both of these functions have a by-product of heat that works as a third component that contributes to particle or points of light budgets. Once this physical limitation or light budget of the laser projector has been hit one can start to see flicker in the imagery provided by the laser projector. It was recognized, therefore, that both tools (i.e., video projection and laser projection) have attributes and limitations, and a key for producing a volumetric display is to use them both in a way that addresses or controls the overall limitations of these two imagery or light sources.

A volumetric display system of the present description may include a video projector and a laser projector. One method of controlling or operating the display system is to utilize the video projection to carry the largest weight of the imagery and to utilize the laser projection (concurrently with or on the same timeline to provide synchronization of the projectors) to add spice, pop, and highlights to the "same" imagery. For example, a video may include a fairy or magical character that is projected on a wall or 2D projection screen with a video projector. The fairy/character may wave a wand, and video-projected pixie dust (e.g., built from particle system software) shoots from her wand on a trajectory across the wall and through a physical lamp post in the room placed against or near the wall, appearing to physically light this 3D prop.

Laser media is triggered at the same time by selective operation of the laser projector with content matching or corresponding to the video content providing the fairy/character. The particle-based media or imagery may be mapped to the wall to be projected onto the same spot (or overlapping) upon which the video or pixel-based pixie dust media starts its trajectory. The laser media can be created using the same base media, but only a portion of the brightest most dynamic particles are used or extracted from the base media/content that makes up the pixie dust media in the video projection. When projected together on this common surface or 2D screen, the result is a spectacular new hybrid of media or blending of two layers of two types of light on an area of the 2D projection screen (e.g., wall surface).

Because the nature of the two forms or types of light and projection systems are so different, the display system is able to offset the limitations of each type of light/projection system and achieve the optimal or an enhanced visual display of the two media. As the two "in-sync" media trail out of the lamp, the laser projection is caused by operation of the laser projector to take another path (e.g., a different trajectory than the video media) so as to move off of the wall or 2D projection screen into the middle of the scenic space or into the volume of the display space by reflecting from a second screen or canvas (e.g., a 3D set).

Particularly, a 3D set of materials may be provided for reflecting the coherent or laser light such as black scrims and tulle-based reflective elements arranged to create an "invisible-to-the-eye-in-the-dark" path for the laser projection to travel upon as it reflects off the scrim/tulle (or other reflective surfaces). This creates a unique volumetric illusion as light jumps from a 2D screen into a volume or space where no obvious projection surface lies or is present. The video light by itself could not perform well on the 3D set and its mesh and/or or low reflectivity surfaces (e.g., less than 10 percent reflectivity). However, the light from the laser projector works magnificently well with the nearly invisible reflective elements of the 3D set (or of the second canvas/projection surface(s)). Because a viewer's eye marries the brain to the brightest part of the media (i.e., the laser particles are noticed much more than the lower brightness video imagery), the viewer does not miss the rest of the media the video imagery was supporting (on the 2D projection surface during presentation of the blended image) when the particle-based content or imagery jumps to the 3D set.

FIG. 1 illustrates a volumetric or 3D display system 100 that can be operated to provide a viewer 105 a volumetric display without the use of special eyewear. The volumetric display blends or mixes two types of light to create a unique effect. To this end, the system 100 includes a 3D display space or volume (or a married media display) 110 that includes a first canvas 112 and a second canvas 120. The first canvas 112 may be used to provide a planar (or substantially so) surface for displaying two dimensional objects or images as shown at 172 and 190. The first canvas 112 may take many forms such as a wall or a projection screen (rear or front projection screen).

The second canvas 120 is arranged to provide one or more surfaces that extend outward from or are spaced apart from the projection surface of the first canvas 112. In this way, light or imagery can be projected on the first canvas 112 and the second canvas 120 and moved between the two canvases 112, 120 as shown with arrow 195 showing light transitioning from a blended light area 190 on the first canvas 112 to a single type of light area 182 on the second canvas 120.

The second canvas 120 may be planar as with the first canvas 112, but, in many applications, it is desirable to provide a 3D set with the second canvas 120 that has volume (e.g., displays reflected light at two or more distances relative to the viewer 105). To provide volume, the canvas 120 may include a backdrop or screen element 122 which may be relatively highly reflective (solid but dark in some cases). Then, one, two, or more reflective elements 124 may be provided that are spaced apart from the backdrop 122 at a first distance, $d_1$, and from each other at a second distance, $d_2$. Often, it will be useful to disguise the presence of the elements 124, and scrim, tulle, or other lower reflectivity material (e.g., material with reflectivity less than about 20 percent, less than about 10 percent, or less than about 6 percent may be used in some implementations of canvas 120). In one implementation, scrim or tulle sheets are hung in front of the backdrop 122 to provide volume for a projected image/light 181.

The canvas or 3D set 120 may also include physical or 3D props 126 that may act to further the impression that the canvas 120 has volume to the viewer 105. For example, 3D props 126 such as candles and lights may be used that are activated, lit, or illuminated when the light 181 has a trajectory that causes it to flow onto or near the objects 126. The canvas 120 may also include 3D reflective elements 128 in front of the reflective elements 124 a distance, $d_3$ (or behind or sandwiched between the elements 124 and props 126). For example, one or more sheets of scrim, tulle, or other mesh/woven material may be rolled, compressed, or otherwise arranged to present a body or multiple layers of the mesh/woven material for reflecting the light 181 (e.g., provide a higher density of material for reflecting the light 181 than a single sheet of material as may be used for reflective elements 124). In one embodiment, the 3D reflective element 128 was placed at a lower level than the elements 124 such that a gravity or falling effect can be provided for the projected imagery 182 as particles "fall" from surfaces of reflective elements 124 onto the reflective element 128 based on a trajectory or path defined for the light 181 (e.g., fireworks explode on elements 124 and embers fall down onto the reflective element 128).

The projection materials that may be used for the first and second canvases 112, 120 may take a variety of forms. The canvases 112, 120 may be chosen to provide solid projection surfaces such as those provided by traditional projection screens, walls, ceilings, floors, architectural features, rocks, trees, ground, and other outdoor or indoor objects. In some cases, it may be useful to use semi-transparent projection surfaces for one or both of the canvases 112, 120 such as water curtains, water spray (e.g., from fountains), steam, liquid nitrogen clouds, smoke, and transparent projection screens. In other cases, it may be useful to use transparent (or nearly invisible) projection screens such as for the second canvas 120 and its reflective elements 124, 128. Perforated surfaces may be used to provide a nearly invisible (in lower light) projection surfaces such as with use of scrims, chiffons, tulles, hardware cloths, expanded metals/meshes/screens, and with diverse natural or manufactured materials (e.g., the second canvas 120 may include tree/bush leaves and branches, grass, foliage, and the like).

The display system 100 further includes a source 170 of a first type of light 171 (e.g., non-coherent light such as may be provided by a DLP or similar video projector) and a source 180 of a second type of light 181. The second type of light 181 may be coherent light, and, in some cases, the source 180 may be an RGB or other laser projector providing laser light 181 (e.g., monochromatic, directional (e.g., focus at infinity), and coherent light) of a particular color and brightness and that is operated to provide particular objects or shapes such as to provide imagery that appears to be fireworks, streaking stars, pixie dust, and other images suited for providing with particle-based media.

The display system 100 includes a controller 130 (such as a computer with a processor and operating system that runs/executes code or computer programs to perform functions as discussed herein and that may be provided in computer-readable media). The controller 130 operates to issue control signals 160, 162 to operate the first and second light-type sources 170, 180 in a manner that is time synchronized. In practice, the light 171, 181 is projected following a single timeline such that projected light/imagery is coordinated to provide interaction and blending of the projected light 171, 181 via the canvases 112, 120.

The controller 130 has or can access memory 132 that stores a first media file 134 and a second media file 140. The first media file 134 may provide video content (e.g., an animated film/clip in digital format) that is used by the controller 130 to generate the control signals 160 to operate the source/video projector 170 to project the light 171 onto the first canvas (e.g., 2D projection screen or other projection surface) 112. In other cases, the control signals 160 are used to provide synchronized playback of the media file 134 that has previously been stored on or fed to the projector 170 for playback (in a wired or wireless manner). The light 171 may be provided alone or in isolation on the canvas 112 as shown at 172 with an area of a single projected light type or in a blended or interactive manner with the light of a second type 181 as shown in area 190 (blended light types area) on the surface of the first canvas 112 (e.g., a fairy's wand may emanate pixie dust that is provided by a blending of video light 171 and laser light 181 in area 190).

The second media file 140 is used by the controller 130 to generate the control signals 162 to cause the second light-type source 180 (e.g., laser projector) to output or project the light (e.g., laser light) 181. The light 181 may be projected onto the first canvas 112 such as to be blended with or provide a second layer of light with the light 171 as shown in the blended light-types area 190 on the first canvas 112. The light 181 may be moved along a trajectory over the surface of the first canvas 112 and may be moved by operation of the laser projector 180 to jump off the surface of the first canvas 112 onto the second canvas 120 as shown with arrow 195 showing a transition or movement between canvases 112, 120. When directed toward the second canvas 120, the light 181 may be mapped to and moved over a single light-type area 182 for selective reflection off of the surfaces of the second canvas 120 defined or provided by backdrop 122, reflective elements 124, 3D props 126, and 3D reflective element 128 to provide a volumetric display perceivable by a viewer 105.

The second media file 140 may store data to define a variety of parameters for the light 181 that can be used by the controller 130 for generating the control signals 162 to operate the laser projector or second light-type source 180. For example, the second or laser media file 140 may store data 142 defining the trajectory or path for the light 181 in the 3D display space 110 and the rate(s) for movement over this trajectory/path. Further, the media file 140 may store data 144 defining the objects/shapes of elements to be provided by the particle-based light 181 on the canvases 112, 120. Further, data 146 may be provided in the media file 140 that defines a number of other features of the light 181 that may be held constant throughout operation of the display system 100 or that may be varied over the timeline used for control signals 160, 162. The parameters defined by data 146 may include brightness of the particles of light 181, which may be provided at a first level of brightness in area 190 (a relatively low luminosity to blend with brightness of light 171 in area 190 such as a brightness that is less than the brightness of light 171) and at a second level of brightness in area 182 (a higher luminosity than in area 190). The data 146 may also define the color of light 181 provide by the projector 180, which may be fixed for a media file 140 or be varied over time (e.g., when the source 180 is an RGB laser projector).

Figure 2A:
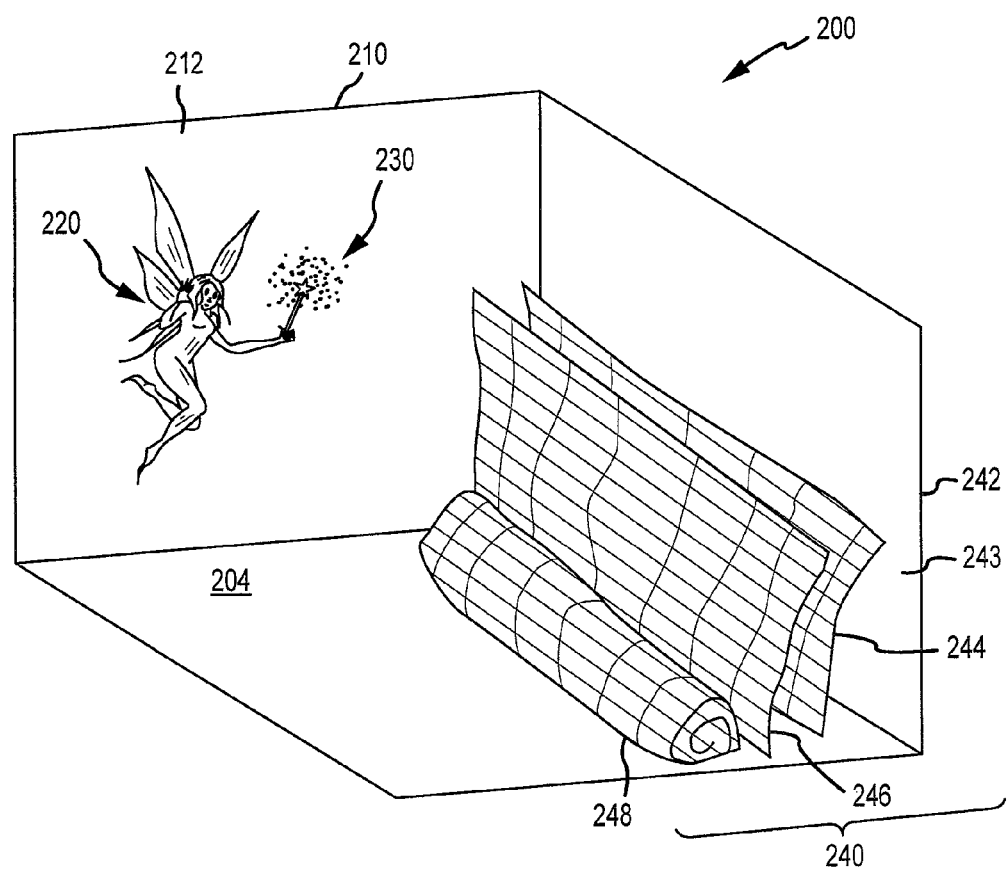
FIGS. 2A-2C illustrate a volumetric display system during operation at three points in time along a timeline or period of operation where two layers of two different types of light are blended and interact to provide volumetric or 3D display.
Figure 2B:
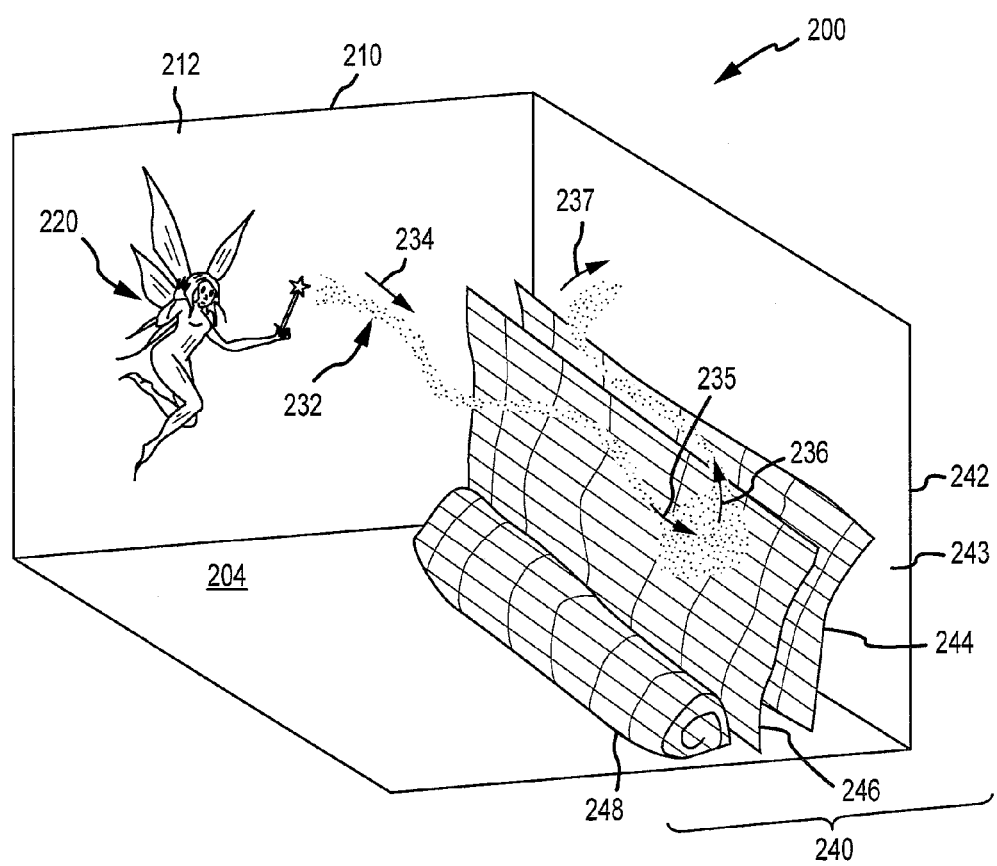
Figure 2C:
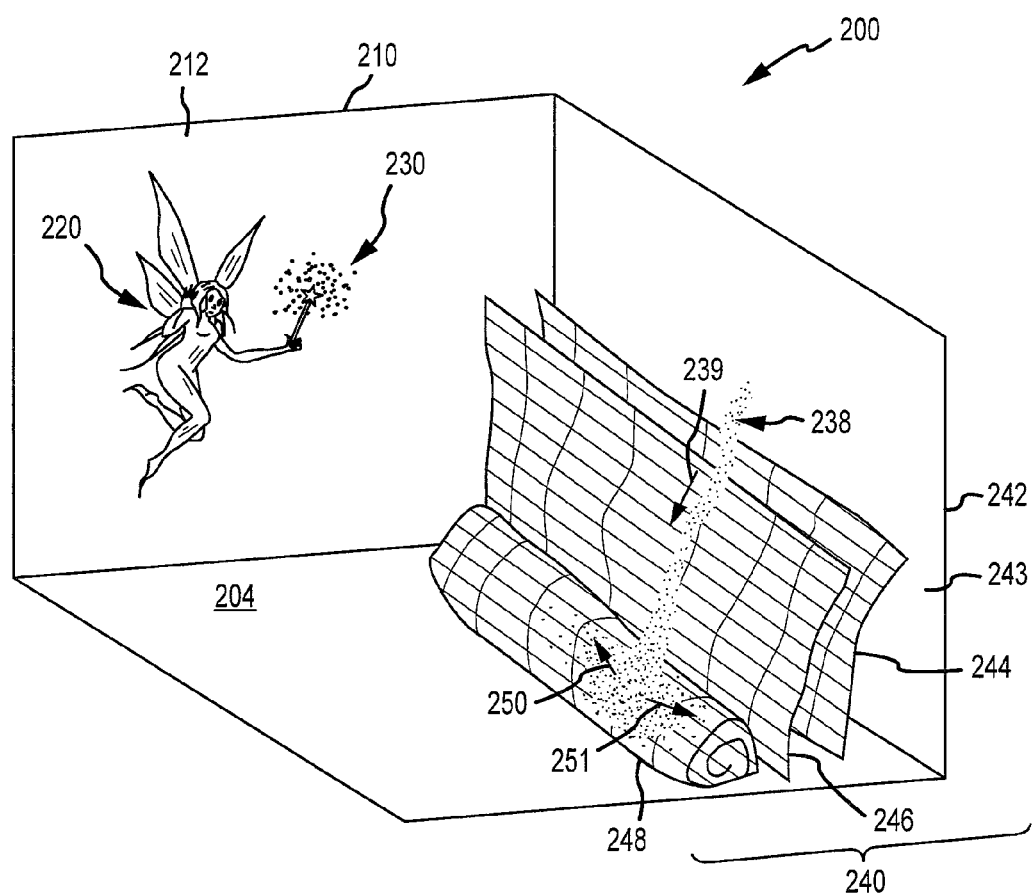

FIGS. 2A-2C show a volumetric display system 200 during three states of operation or at three points along a control timeline. The volumetric display system 200 may take the form show for system 100 of FIG. 1, and FIGS. 2A-2C illustrate what a viewer or observer (not shown) may observe during operation of two (or more) light sources (not shown but may take the form of sources 170 and 180 shown in FIG. 1 for system 100) to provide two types of light such as light from a video projector (e.g., non-coherent light) and light from a laser projector (e.g., coherent light).

The display system 200 includes a first canvas or projection screen 210 that provides projection surface 212. The first canvas 210 may take the form of a wall or a conventional projection screen. The display system 200 includes a second canvas or 3D set 240. The 3D set 240 is formed of a backdrop or screen 242 providing second surface 243, and the backdrop 242 may be wall, a projection screen, a curtain, or the like. The 3D set 240 is not planar in most cases and includes reflective elements 244, 246 spaced apart from surface 243 some distances. The reflective elements 244, 246 may be provided by sheets of tulle, scrim, or other lower reflectivity material that may be chosen to be nearly invisible to a viewer until illuminated by one of the light sources of system 200 (such as with a laser projector). A non-planar or volumetric reflective element 248 may be positioned on or near the ground/floor 204 in front of the reflective elements 244, 246 and the backdrop/screen 242, and this element 248 may be formed of one or more sheet of scrim, tulle, or the like but be arranged to provide multiple layers of mesh material (e.g., a sheet of scrim or tulle folded upon itself or simply a wrinkled or non-planar sheet of tulle or scrim placed on the floor 204).

FIG. 2A illustrates the display system 200 at a first time along an operational or control timeline or first operating state for a projection system (a laser projector and a video projector). As shown, a video projector is being used to project light to provide a projected object or content 220 on the surface 212 that is provided by a first type of light. The content chosen in this example for object or displayed imagery 220 is a flying fairy or magical character that may fly or move about the surface 212. Concurrently, a laser projector is being used to project light to provide a projected object or content 230 on the surface that is provided by a second type of light (e.g., laser light rather than non-coherent light used to provide imagery 220).

The projected object or content 230 is mapped to the location of the object 220, and, in this example, the content of the media file is chosen such that the projected object 230 takes the form of a cloud of pixie or magical dust floating about the end of a wand of object or video imagery 220. When the wand/object 220 is moved on surface 212, the pixie dust/object 230 moves, too, in a corresponding manner to remain blended with (or layered over) the video imagery of object 220. The illumination levels of the two sources providing objects 220, 230 may be controlled to match so that the objects 220, 230 appear to be provided or projected by a single source. In the first point of time or operating state of FIG. 2A, no light is projected onto the 3D set or second canvas such that much of this set may be hidden from view or hard to detect by a viewer (such as elements 244, 246, 248).

FIG. 2B shows the volumetric display system 200 at a second point in time on the timeline or a second operating state. At this point on the control or synchronization timeline used by a controller, the video content/object 220 continues to be projected upon the projection surface 212 (e.g., by operation of a video projector and the object 220 may be animated and fly about the surface 212).

Further, though, the object/content provided by the other projector or light source (e.g., the laser projector) has changed as shown at 232 so that it is moving away from the object 220. The trajectory/path and movement of the content/object 232 is shown with arrow 234 (to move upon the surface 212), with arrow 235 to move onto and over areas of the reflective element 246, with arrow 236 to move onto and over areas of the reflective element 244, and with arrow 237 to move onto and over areas on the surface 243 of the backdrop or screen 242. The rate of this movement may vary over a large range to achieve a desired effect as may the shape of the stream 232 and of the objects/shapes of elements provided within the stream 232 (e.g., to achieve a stream of moving pixie dust versus shooting sparks from fireworks or an explosion or to achieve a different effect). The projected object/content 232 may be provided with a laser projector and be visible due to reflection of this coherent light off the surface 212 of the projection screen 210 as well as surfaces (e.g., tulle, scrim, or other surfaces) of the elements 244 and 246 and surface 243 of backdrop 242. In this manner, the imagery is provided volume as it transitions or jumps from the planar surface 212 to the surfaces of the 3D set or second canvas 240.

FIG. 2C shows the volumetric display system 200 at a third point in time on the timeline or a third operating state. At this point on the control or synchronization timeline used by a controller to control projection, the video content/object 220 continues to be projected upon the projection surface 212 (e.g., by operation of a video projector and the object 220 may be animated and fly about the surface 212).

Further, though, the content provided by the laser projector (or source of a second type of light) has changed again as shown with projected content 238. In this example, the cloud or stream of pixie dust provided by numerous bright particles (e.g., small circles or stars or other shapes) is streaming down or falling (as if due to gravity after striking surfaces on the 3D set 240). As shown with arrow 239, the stream of dust or projected object/content provided by the laser light (or second type of light) is reflected from surfaces of backdrop 242 then from surfaces of reflective element 244 then from surfaces of reflective element 246. Then, as shown with arrows 250, 251, the projected content 238 is selected so as to or adapted to give the appearance the pixie dust or sparks bounce off the ground 204 with the trajectory of the stream/cloud 238 abruptly changing direction back upward or away from the ground 204 on the reflective element 248.

An observer or viewer may not be able to see the elements 244, 246, 248 themselves but only the projected content which is particle-based (e.g., small shapes provided by a laser projector). Hence, the viewer sees or perceives what appears to be a cloud of pixie dust or sparkling particles floating or flying through the air off of the screen 212 to a space/volume adjacent the surface, striking the wall/surface 242, falling toward the ground 204, and then bouncing off of and later settling onto the ground 204.

Figure 3:
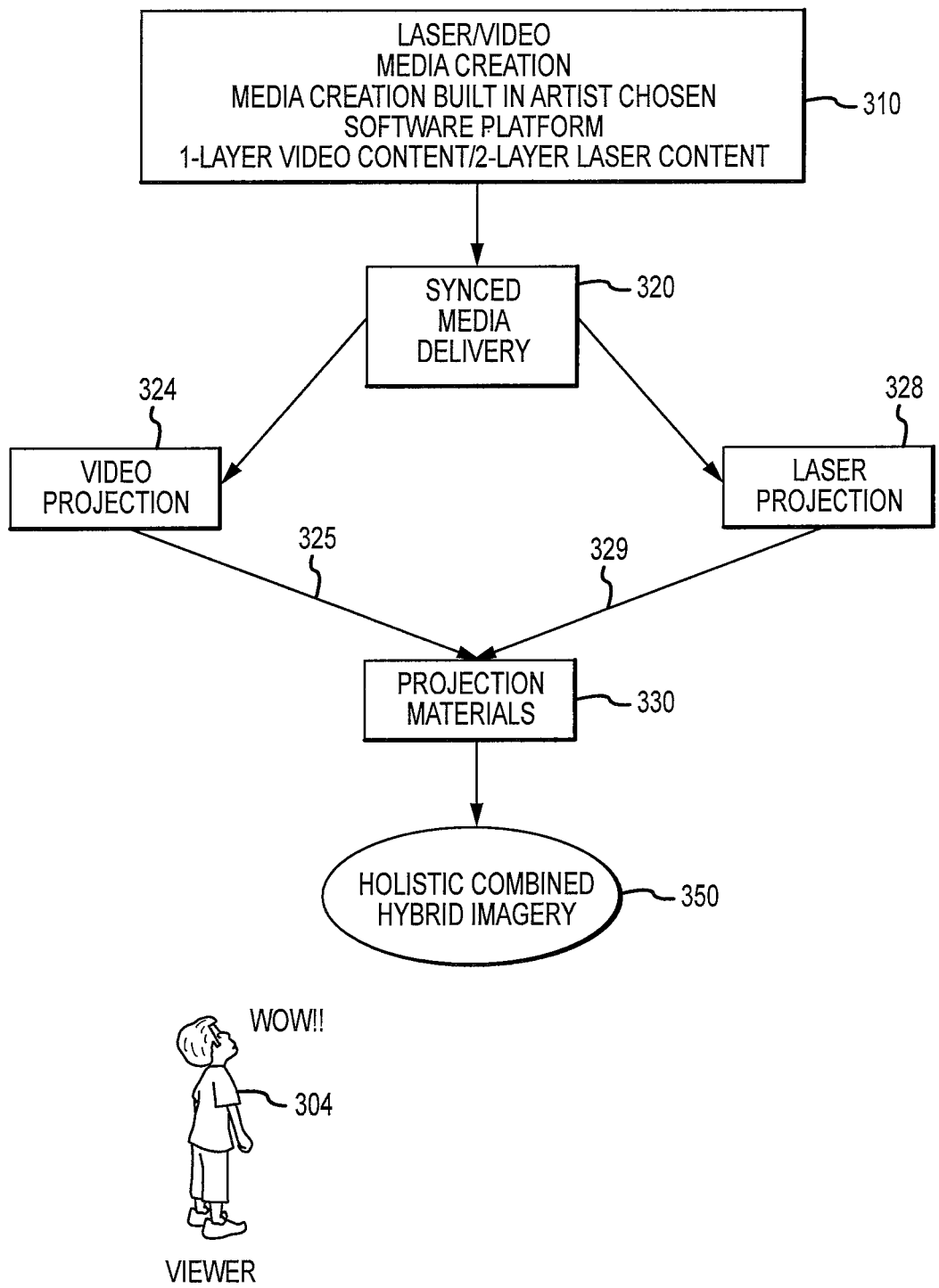
FIG. 3 is a flow diagram of the method of integrating volumetric and non-volumetric projections or media to provide a unique volumetric or 3D display to a viewer.

FIG. 3 is a flow diagram of a method 300 of integrating volumetric and non-volumetric projections or media to provide a unique volumetric or 3D display 350 to a viewer 304. At step 310, the laser and video content files are created and stored in memory (e.g., memory 132 used to store media files 134, 140). At step 320, a controller operates to synchronize the delivery of the two types of media to a device or system used for video projection and to a device or system used to provide laser projection. Step 320 may be considered a controlled operating loop in which the two different types of media are presented to a viewer as shown at 350 such that the corresponding frames of each file created at step 310 are concurrently projected to provide proper blending and interaction of the video imagery (first type of light) and the particle-based imagery (second type of light is the laser light).

Video projection proceeds at 324 to provide or project a first stream of light 325 onto a set of projection materials 330 such as upon a planar portion or element (e.g., a projection screen, a wall, or the like). Laser projection proceeds concurrently (along the same timeline as used for video projection 324) at 328 to provide or project a second stream of light 329 onto the set of projection materials 330 such as with overlap on the planar portion or element(s) used to display the video imagery and/or with separate display on a separate planar portion or on components used to provide a 3D set nearby to the planar portion(s). The result of the projection 324, 328 of the two types of light 325, 329 onto the projection materials 330 is a display to a viewer 304 of a holistic, combined imagery 350 that is a hybrid of two types of light, e.g., non-coherent light with coherent (or laser) light on the same and differing portions of the projection materials.

With regard to the video projection 324, a video projector such as a DLP projector may be used to project the video file contents onto a planar portion or element of the projection materials 330 to provide non-volumetric projections/images visible by the viewer 304 as part of the hybrid imagery 350. Video projection 324 is advantageous for use in providing the imagery 350 because it is raster based and because a video projector is able to produce many complex images over a very large physical area within a single frame without taxing the projector system or causing flicker.

However, by itself, video projection 324 is also disadvantageous due to the following issues: (a) the ability of an image to be in focus on a given surface is dictated by the focal length of the projector with a given lens; (b) color, contrast, and brightness are limited in a lamp projector compared to a laser projector; (c) materials and surfaces for use in projection surfaces 330 are limited because solid, lighter colored surfaces produce much brighter imagery and as the surface becomes more open or perforated (e.g., scrim or tulle) the projected image begins to quickly decrease in quality due to loss of brightness, contrast, and depth of color; (d) video projection image quality is greatly affected by the quality of the surface on which it is projected with front projected video image quality being the best when it is reflected off solid and lightly colored surfaces; (e) lamp video projectors are very inefficient with respect to the amount of light produced by the lamp versus the light that ends up on the projected surface; (f) video projection requires certain ambient light levels to produce quality imagery; and (g) lamp projectors have a technical limitation to the amount of light they can produce. Due to limitation (d), while scrims can be projected upon with video projection/light, scrims and similar materials do not reflect imagery with as high of quality as planar surfaces due to the limited amount of power of the light produced at the surface of the scrim per pixel. Contrast, brightness, and color saturation are lost on even the tightest pitched scrims. Because of these losses, using volumetric techniques through the use of tulles and scrims has limitations with video projection, and the faint quality of imagery produces ghostly, washed-out images that need low ambient lighting levels to even be seen or perceived by a viewer.

With regard to the laser projection 328, a laser projector(s) (such as a scanning laser projector) is used to project the laser file contents onto the planar portion or element with the video stream 325 and also upon one or more other portions or elements of the projection materials 330 to provide volumetric projections/images visible by the viewer 304 as part of the hybrid imagery 350. Laser projection 328 is advantageous for use in providing the imagery 350 for at least the following reasons: (a) laser projection has enormous and scalable levels of power and brightness; (b) laser projection has high color saturation and a wide color gamut; (c) laser projection has useful contrast ratios; (d) imagery provided by laser projection always appears to be "in focus" at any distance near or far due to the fact that scanning laser projectors output highly coherent light; (e) laser imagery reflects well on solid surface materials such as planar projection screen and on open surface materials (e.g., scrims, tulles, meshes, and the like) because of the very high brightness levels that can be provided by laser projectors; and (f) the ability to reflect quality images from perforated or porous materials such as scrims and tulles allows for volumetric techniques and methods to be done very effectively without ghosting or unacceptable loss of image quality.

However, by itself, laser projection 328 is also disadvantageous for a number of reasons. Laser projectors are vector based (not raster based as the case with video projectors) and cannot produce the amount of complex imagery over a large surface as can video projectors. Laser projectors are limited to a given amount of points or lines that can be drawn over a given surface in a given time. This is due to the limited physical speed at which the galvanic scanning mirrors can move and the speed at which the RGB lasers can be turned on and off. Both of these functions create debilitating heat to the system that has to be managed. There are many visual artifacts that are revealed when surpassing the particle budget including flicker. Laser light can have speckle, and this can be good or bad with regard to a displayed image 350 depending upon the desired outcome of the look of a light-based display.

With regard to the projection materials and surfaces 330, special effect techniques and methods may be used to produce volumetric imagery with these two types of light streams 325, 329. By strategic placement of specific projection materials that is coordinated with the blending of laser and video projected media 325, 329 on these given surfaces, the method 300 can be used to produce compelling looks and volumetric experiences. For example, the non-volumetric projections 325 may be projected upon solid surfaces 330 (e.g., traditional projection screens, walls, ceilings, floors, architectural features, rocks, trees, grounds, and indoor/outdoor solid surfaces available in a 3D display space/volume) or on semi-transparent surface 330 (e.g., water curtains, sprayed liquids and/or solids, steam, clouds (e.g., formed using liquid nitrogen), smoke, and transparent projection screens). The volumetric projections 329 may be projected on these same surfaces with the video light stream 325 to blend the two light types and before and/or after such blending may be projected on other solid or semi-transparent surfaces and/or on perforated surfaces (e.g., scrims, chiffons, tulles, hardware cloths, expanded/meshed materials, foliage, and so on) arranged in a volumetric manner or in a 3D set.

At this point, it may be useful to provide further explanation of workflow or steps involved in creating the laser and video media (which may be built in or formed in a software platform or digital format that can be selected by a particular artist or display designer to support the synced media delivery 320 and projections 324, 328).

Combining laser media and video media creates a unique look that is more dynamic and exciting for a viewer or audience member. An example of this can be illustrated with something as simple as pixie dust. Video media is used to project a flying fairy against a background where she waves a wand and sends pixie dust swirling outward in a linear path. Laser particle projection supplements the projected video by adding pixie dust as it swirls around in the scene. Step 310 includes creating the laser media file from the video file (e.g., selecting components of the video file to be provided with laser projection 328, creating the shapes, and mapping these shapes/particles to the video components and their trajectories on the projection surface). Step 310 also involves balancing the laser light qualities of super brightness and saturation with the detailed video image to provide a unique look in the resulting media hybrid that is more dynamic and exciting to the viewers watching the hybrid imagery 350.

The blending on a 2D planar projection surface in the materials 330 can be expanded upon by splitting the laser and video projected light at a location on the 2D projection surface 330 where the laser projection jumps off the screen 330 on to a series of scrims or other projection components 330 arranged in a 3D set to create a volumetric dimensional look in the hybrid imagery 350 for the viewer 304.

Designing each format (or content provided by two differing light types) as well as synchronizing the two is an important step 310 in order to effectively create this unique and more dynamic look in imagery 350. When designing media for both video and laser projection 324, 328, one should take in account the limitations for both mediums. In the above example, the video media may be used to provide a significant percentage or fraction (e.g., 70 to 90 percent or more) of the overall image due to its wider range of detail and color. However, video is limited to the type of projector and to the type of screen surface used in regards to luminance and contrast, which can make the image feel dull and flat.

Laser particle projection has a high luminance and contrast output. Step 310 may involve choosing to accent the video projection 324 with the laser projection 328 (e.g., with the remaining 10 to 30 percent of the image) to provide 325, 329 a resulting image (100 percent of the image) 350 that becomes more dynamic for the viewer 304. By taking advantage of the laser's brightness, one can project 329 on surfaces 330, such as a series of scrims, to create a volumetric dimensional look. This is a good example where video media would fail to provide an effective look due to its limitations as mentioned above. However, the laser is limited to particle volume and the speed of the animation that can result in laser blanking which appears to the naked eye as flickering light. Lasers also cannot provide the detail image that video can provide. The best it can produce is a stroke outline of an object. Hence, step 310 involves a careful balance between both mediums including keeping their limitations in mind to produce a magical and exciting experience/imagery 350.

Figure 4:
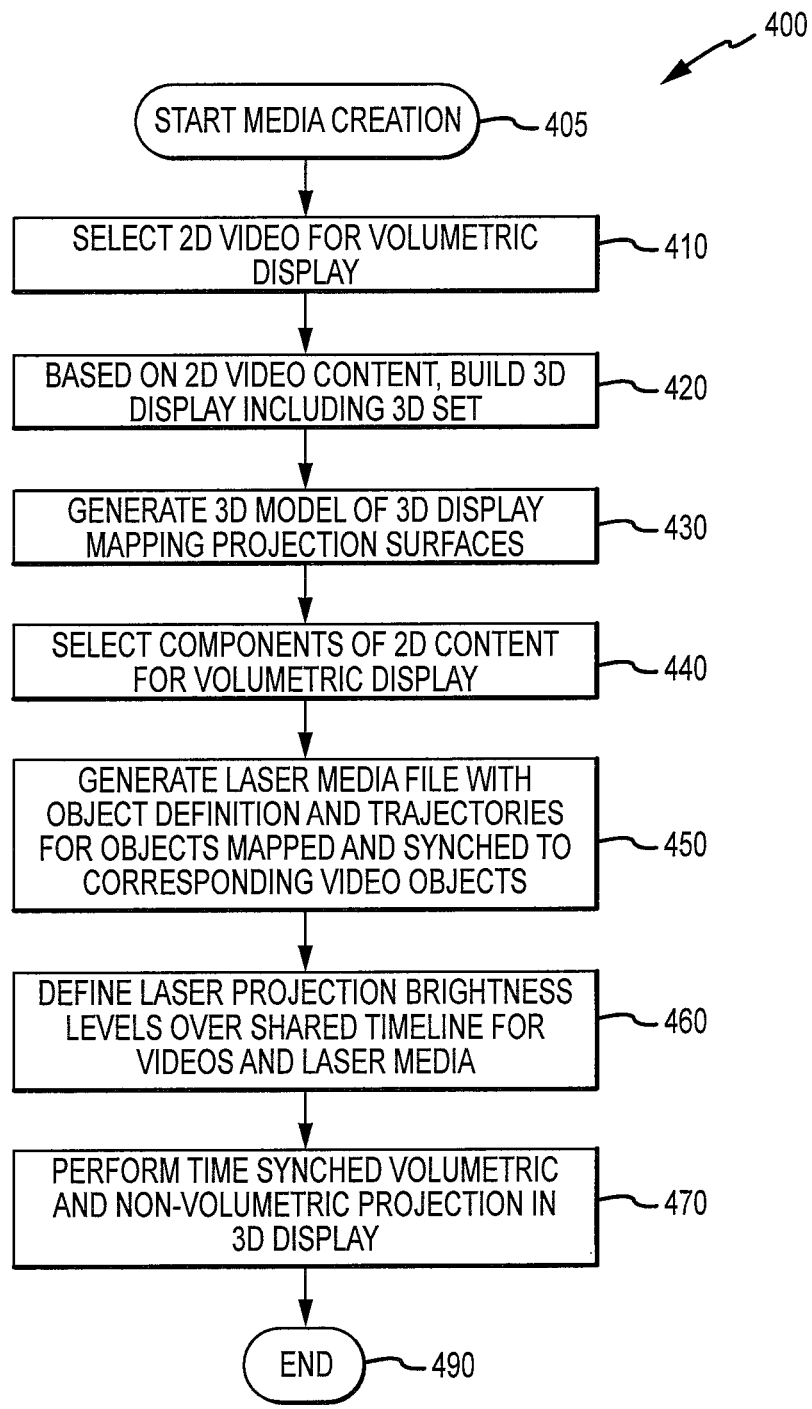
FIG. 4 is a flow diagram of a method 400 of creating (and then projecting) media for integrating volumetric and non-volumetric projections to provide a unique hybrid image.

FIG. 4 is a flow diagram of a method 400 of creating (and then projecting) media for integrating volumetric and non-volumetric projections to provide a unique hybrid image. The method 400 starts at 405 such as by choosing a space or location for providing a 3D display space and choosing one or more video projectors for use in projecting the video portion of the media and one or more laser projectors for use in projecting the laser portion (coherent light) of the media. Step 405 may also involve choosing a controller for operating the two or more projectors in a time synchronized manner (project corresponding frames of each of the media files along a shared or single timeline) such as with an integrated control loop.

The method 400 continues at 410 with selecting a 2D video for use in the 3D display space or volume. For example, an animated film or clip may be chosen that includes one or more animated characters or objects presented in one or more scenes. At step 420, the method 400 includes building a 3D display with a plurality of projection surfaces and/or materials. The 3D display typically will include at least one 2D or planar projection surfaces such as one provided by a wall or a conventional projection screen. A video projector(s) may be focused for projection upon this 2D or planar projection surface using the 2D video or content chosen at step 410. The 3D display also will be built to include one or more additional projection surfaces such as a plurality of reflective elements/surfaces in a 3D set positioned adjacent the 2D or planar projection surface used to display the non-volumetric or video imagery. The 3D set may include one or more sheets or layers of scrim, tulle, or other low reflectivity (less than about 20 percent and more typically less than about 10 percent) and/or perforated materials that are spaced apart to provide layers or depths of reflective points for laser light. Additionally, 3D props and backdrop materials may be included to reflect the laser light to a viewer or to otherwise create a volumetric effect. In some cases, the trajectories for volumetric images to be provided by laser light is first determined, and these trajectories are used to selectively position the reflective elements/projection surfaces in the 3D set.

At step 430, the method 400 includes generating a 3D model of the 3D display and its projection surfaces, and this model or mapping data may be stored in memory/data storage for use in later steps (e.g., trajectory defining). This step 430 typically involves defining physical locations or coordinates of each projection surface in three-dimensional space. The method 400 continues at 440 with selecting one or more of the components or objects of the 2D content (video format file used to provide non-volumetric images) for use in generating volumetric images that can move off of the 2D projection surface. In the above examples, an artist or display designer may select magical or pixie dust for use as the volumetric images. In another example, fireworks or the sparks/light associated with fireworks may be chosen at step 440. In another case, the 2D video content may involve an object or objects that generate sparks, and the stream of sparks (fire embers) may be chosen at step 440 for use in creating a volumetric image.

With this selection made, the method 400 continues at step 450 with the generating of a laser media file (e.g., an IDLA file that is scan based) based on this selected 2D object(s) or image. Step 450 typically involves choosing shapes/objects (and numbers, size, and density of such shapes/objects) that can be created with laser light or particle-based projection to represent or generate imagery that matches, imitates, or accents the 2D images. A color (or colors) is chosen for the volumetric images to define how the laser projector will be operated during later projection steps. Then, using the 3D model of the 3D display space including the 2D projection surface and the 3D set with its reflective elements or projection materials, step 450 also includes defining trajectories and rate(s) of movement of the shapes/objects along such trajectories/paths. For example, the shapes/objects may be a plurality of small stars, and the stars may be held stationary for a first period of time to float over a non-volumetric object displayed on a 2D projection surface and then caused to move away from the non-volumetric object and off of the 2D projection surface and over reflective elements in the 3D set in a predefined pattern and at a predefined rate. The trajectories/paths are chosen to correspond with the locations/coordinates in the 3D display space of the projection materials (or reflective elements). Step 450 may involve use of an automated raster-to-vector converter or generator program or may be performed manually by an artist or technician.

At step 460, the method 400 includes defining laser projection brightness levels over the shared timeline for video and laser media. Typically, the video projector(s) will have a fixed brightness (e.g., a lumen rating for a DLP projector or the like). The illumination level of the laser projector generally is set relatively low (well below maximum brightness/power outputs of the laser projector) during portions of the control timeline in which the laser light is targeted onto the 2D projection surface with the video projector's light. This helps blend the two different types of light such that the laser light and the objects it is used to display do not overpower the lower brightness of the video projector's imagery.

However, the illumination or brightness levels of the laser media is typically significantly increased at the point in the timeline when the laser light jumps or moves off of the 2D projection surface (or the point on the trajectory of the shapes/objects where the laser light jumps off the 2D projection surface). This allows the laser light to appear to the viewer with the same (or higher or lower) brightness as when on the 2D projection surface when it is reflected off of different projection materials such as perforated materials (scrims, tulle, chiffon, or the like). The laser media file is then stored in memory/date storage.

The method 400 continues at 470 with performing time-synchronized projection of the volumetric and non-volumetric images in the 3D display built in step 420 (or another space). The laser projection is considered volumetric projection since the laser particle projection moves from a first projection surface to one or more second projection surfaces to display the particles (shapes/objects) in a volume or 3D display space. In contrast, the video projection is considered non-volumetric in this case as the light projected from the video projector based on the 2D video file selected in step 410 is projected onto a planar surface (e.g., a conventional projection screen). The method 400 then ends at step 490 or may be repeated at step 410 to create new media or at step 470 to repeat display of the created media.

As can be seen from the above, the display systems are adapted for providing volumetric imagery without the need for wearing glasses or headgear. The display systems achieve such imagery by projecting two types of light that provide and/or have different qualities. In some implementations, one type of light is non-coherent light from a video projector and a second type of light is provided using a laser projector so as to provide coherent (or laser) light that is more intense (e.g., has higher luminosity) and is one color such that it "pops" off the projection screen and 3D set elements. The content or laser media used to operate the laser projector is typically derived from video media such as a 2D movie or animated clip or the like. Hence, the description has concentrated both on the workflow used to create the two media files used to concurrently control the two (or more) projectors used to project the two types of light, with the frames of each being provided in a time-synchronized manner.

The 3D or volumetric effect is achieved in large part by providing a 3D set with reflection elements (or projection surface) that are non-planar with the first 2D projection surface (that is used for the projection of the 2D video content). The laser light and its content/media are moved so that it "jumps" from the 2D projection surface onto the 3D set components. When the laser light is on the 2D projection surface with the non-coherent light from the video projector, the illumination levels of the laser projector are set to be at relatively low levels (e.g., within about 25 percent the illumination levels as the video light from the video projector and often at lower levels than the video projector). Then, when the laser light moves to the 3D set with its lower reflectivity (e.g., scrims and toules), the laser projector is operated to significantly increase its illumination levels such as to up to 2 to 4 (or more) times what was used on the 2D projection surface. To the observer, this may be used to provide a display where there appears to be little to no drop off in the brightness or luminosity of the displayed imagery even though light is being projected onto a mesh or low reflectivity surface (which may be nearly invisible to the observer prior to being projected upon with the laser projector as it may include ⅛-inch openings or the like and projection involves striking intersections of fabric threads/wires).

The coordination and integration of the two projected light types is very high and often includes projecting the two types of light onto a single surface to display a single image or object (e.g., a cloud of pixie dust, fire, sparks, fireworks, and so on may be provided at least for a portion of the display using both types of light projectors prior to a division onto separate projection surfaces). The particle-based laser projection is composited with the video media in some cases to achieve such high levels of integration. A 3D canvas is created or built and then a 3D model is made of such a 3D set or canvas. The 3D canvas or set may be provided by placing larger opening or less dense toule or scrim layers and then providing next layers that have smaller and smaller openings (more and denser materials). The different layers may be placed at different angles to catch different portions of the laser light. Some of the layers or reflective elements may be moved during the projection such as with rotation (by motors) or by air movement (by fans) to achieve time-varying volumetric displays with the 3D canvas or set.

Then a particle generator can be used to generate the content or laser media (such as based on the video media file/content). The physics are defined for the particles, and then a trajectory is created and stored for the particles that maps the particles to 2D and 3D projection surfaces and props in the display environment or space. The 3D space is unique in that viewers can move through the display space during operation of the two (or more projectors) typically without interfering with the produced imagery. During concurrent projection on a single surface, the two types of light are blended together, and this projection step/function may be thought of as providing an overlay of video and laser light. The laser light may be just a bit brighter than the video (e.g., within 5 to 25 percent of the luminosity of the video). The video may be thought of as the background layer, and both projected content are running on the same timeline for synchronous projection (e.g., on a closed control loop).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

From the above description, it can be seen that, rather than merely considering a laser projector (e.g., pixie dust projection device) as light that has a position in space at any given time, the light from the laser projector is given a physics model with optical and other properties (e.g., mass, hardness, surface resistance, and the like). Hence, the "light object" or particle, which appears to exist out in the volume or display space (e.g., 3D or volumetric space adjacent a 2D projection screen displaying a video or conventional image media), can float, can collide with other objects such as set elements or props and bounce off them or activate them (ignite a flame, for example), and can emit light that illuminates other objects and causes other objects to appear to cast shadows.

The display system and method coordinate the presentation of two types of light (coherent and non-coherent (e.g., light from DLP projector or the like) light) to create a single show or light-based display. The light-based display has a fluid effect that occurs both on screen and off screen so as to produce a light effect that begins on a 2D projection screen (where the two light-types are blended or projected concurrently) and moves off the 2D projection screen onto a 3D set made up of a set piece(s), a scrim or tulle element(s), and backdrops/screens. For example, the particle-based media may jump from the 2D projection screen into a 3D set to be concurrently reflected off of spaced apart layers of tulle and/or scrim and 3D props to provide volume. The trajectory, brightness, color, and other characteristics of the coherent light may be selected to create a desired effect such as producing fireworks over the viewer's head, to cause pixie or fairy dust to fly about or dance upon props, and so on.

The display system and method produces a blended media experience that is new and unique. Concepts that may be familiar to on-screen (non-volumetric) media such as giving the objects physical models are carried out instead using a volumetric space. The display system and method creates the media so that the volumetric components and non-volumetric components not only exist together (at least part of the time in a blended media or light-type region on the 2D projection screen or surface) but interact with each other to provide an integrated media presentation.

A method has been discussed for producing a visual effect in a venue having a first display surface or canvas that is two dimensional (2D) and a second display element or canvas that is volumetric. The second display space includes reflective and/or light-emitting surfaces. The method includes providing first content, which is pixel-based imagery, configured to be displayed on the first display surface. The method also includes displaying second content, which is particle-based imagery, including second imagery on the second display element in a manner that is thematically coherent or coordinated with the first imagery. The first and second content may be selected such that an object is first displayed in or on one of the first and second canvases and then later displayed in or on the other one of the first and second canvases.

In this description, reference is made to the fact that the new display medium provided by the blending of two light types and a specially designed volumetric set does not only provide a particle cloud (e.g., by using the phrase "particle-based shape" in the description). Instead, it should be clear to those skilled in the arts that the present methods and systems not only provide pixie dust-type particle systems or displays but are also very useful for other display designs including, but not limited to, vector-drawn shapes. With vector-drawn shapes, the projector is not blanking on and off as it does to make particle points but stays on while the mirrors draw shapes repeatedly to appear solid.

We claim:

1. A method for creating a volumetric display, comprising:
   projecting a first light type onto a planar projection surface to display first content;
   concurrently with the projection of the first light type, first projecting a second light type that differs from the first light type onto the planar projection surface to display second content that at least partially overlays the displayed first content; and
   second projecting the second light type onto a three dimensional (3D) set of reflective elements, whereby the second content moves between the planar projection surface and the 3D set.

2. The method of claim 1, wherein the first light type comprises non-coherent light and wherein the second light type comprises coherent light.

3. The method of claim 2, wherein the projecting of the first light type includes operating a video projector and wherein the first and second projecting of the second light type includes operating a laser projector.

4. The method of claim 3, wherein the operating of the video projector and the operating of the laser projector are time synchronized to cause corresponding frames of the first and second content to be concurrently displayed.

5. The method of claim 3, wherein the first projecting of the second type of light provides laser light at a first illumination level and wherein the second projecting of the second type of light provides laser light at a second illumination level that is at least two times the first illumination level.

6. The method of claim 5, wherein the first illumination level of the laser light is within a range of plus or minus 25 percent of an illumination level of the first light type provided by the video projector on the planar projection surface.

7. The method of claim 1, wherein the second content is generated by:
   defining physical characteristics for a set of particles;
   creating a 3D model of the planar projection surface and the 3D set; and
   defining trajectories of the set of particles over a timeline, wherein the projection of the set of particles is mapped to physical locations of the planar projection surfaces and the reflective elements of the 3D set and wherein the timeline is used to synchronize projection of frames of the first content and the second content.

8. The method of claim 1, wherein the reflective elements of the 3D set comprise two or more layers of material with reflectivity of less than about 20 percent.

9. The method of claim 8, wherein the material comprises at least one of scrim, toule, and mesh sheet.

10. A volumetric display system, comprising:
    a first canvas;
    a second canvas including at least one projection surface that is non-planar to the first canvas; and
    a projection system concurrently projecting video content onto the first canvas and particle-based content on the first canvas for a first time period and on the second canvas for a second time period, whereby the particle-based content is blended with the video content in an area of the first canvas during the first time period, and
    wherein the projection system comprises a video projector and a laser protector, and
    wherein the volumetric display system further comprises a controller controlling operation of the video and laser projectors to synchronize delivery of frames of video content via the video projector and corresponding frames of particle-based content via the laser projector.

11. The system of claim 10, wherein the first canvas comprises a planar projection surface and the second canvas comprises two or more reflective elements with reflectivity of less than about 20 percent.

12. The system of claim 11, wherein the reflective elements comprise at least one of scrim, toule, chiffon, and mesh material.

13. The system of claim 10, wherein the laser projector is operated at a first illumination level during the first time period and then at a second illumination level higher than the first illumination level during the second time period.

14. A method of generating media for a volumetric display, comprising:
    selecting a set of 2D video content for projection with a video projector on a planar surface over a timeline;
    generating a 3D model of the planar surface and of projection surfaces within a 3D set associated with the planar surface;
    defining a set of particle-based shapes for projection on the planar surface and on the projection surface of the 3D set with a laser projector; and
    generating a trajectory of the set of particle-based shapes over the timeline, wherein the trajectory maps the set of particle-based shapes to a plurality of positions on the planar surface and the projection surface of the 3D set.

15. The method of claim 14, further including defining a first illumination level for the set of particle-based shapes corresponding to projection on the planar surface and a second illumination level greater than the first illumination level corresponding to projection on the projection surfaces of the 3D set.

16. The method of claim 15, wherein the first illumination level is within a range of plus or minus 25 percent of an illumination level of the video projector.

17. The method of claim 15, wherein the second illumination level is at least 200 percent of the first illumination level.

18. The method of claim 14, further including selecting an object within the set of 2D content and wherein the trajectory moves the set of particle-based shapes over an area on the planar surface overlapping with a projection of light associated with the object by the video projector.

19. The method of claim 14, wherein the defining of the set of particle-based shapes comprises defining physical characteristics of a plurality of particles and wherein the trajectory is generated based on the defined physical characteristics.

* * * * *